United States Patent
Barish et al.

(10) Patent No.: US 11,475,574 B2
(45) Date of Patent: Oct. 18, 2022

(54) METHODS FOR UNIT LOAD DEVICE (ULD) DOOR TARP DETECTION

(71) Applicant: ZEBRA TECHNOLOGIES CORPORATION, Lincolnshire, IL (US)

(72) Inventors: Justin F. Barish, Kings Park, NY (US); Adithya H. Krishnamurthy, Hicksville, NY (US)

(73) Assignee: Zebra Technologies Corporation, Lincolnshire, IL (US)

(*) Notice: Subject to any disclaimer, the term of this patent is extended or adjusted under 35 U.S.C. 154(b) by 269 days.

(21) Appl. No.: 16/828,692

(22) Filed: Mar. 24, 2020

(65) Prior Publication Data

US 2021/0304414 A1 Sep. 30, 2021

(51) Int. Cl.
*G06T 7/12* (2017.01)
*G06Q 50/28* (2012.01)

(52) U.S. Cl.
CPC .............. *G06T 7/12* (2017.01); *G06Q 50/28* (2013.01)

(58) Field of Classification Search
None
See application file for complete search history.

(56) References Cited

U.S. PATENT DOCUMENTS

| | | | | |
|---|---|---|---|---|
| 4,727,679 A | * | 3/1988 | Kornbrekke | E05F 15/63 49/340 |
| 7,842,137 B2 | * | 11/2010 | Classen | A47L 15/4295 134/113 |
| 7,893,826 B2 | * | 2/2011 | Stenlund | B60R 25/1004 702/2 |
| 7,927,427 B2 | * | 4/2011 | Classen | A47L 15/4295 134/25.2 |
| 9,025,071 B2 | | 5/2015 | Mirbach et al. | |
| 9,638,800 B1 | | 5/2017 | Skowronek et al. | |
| 10,898,055 B2 | * | 1/2021 | Wöbkemeier | A47L 15/4295 |
| 2018/0352119 A1 | * | 12/2018 | Hicks | G01B 11/2504 |
| 2019/0195617 A1 | * | 6/2019 | Krishnamurthy | G01B 11/002 |
| 2019/0197318 A1 | | 6/2019 | Krishnamurthy et al. | |
| 2019/0197455 A1 | | 6/2019 | Krishnamurth et al. | |
| 2019/0197701 A1 | | 6/2019 | Krishnamurthy et al. | |
| 2019/0197719 A1 | | 6/2019 | Barish et al. | |
| 2020/0014888 A1 | | 1/2020 | Magal | |
| 2021/0058539 A1 | * | 2/2021 | Van Der Sijde | G01S 7/484 |
| 2021/0304414 A1 | * | 9/2021 | Barish | G06T 7/73 |

OTHER PUBLICATIONS

International Search Report and Written Opinion for International Application No. PCT/US2021/023704 dated Jun. 24, 2021.

* cited by examiner

*Primary Examiner* — Tahmina N Ansari
(74) *Attorney, Agent, or Firm* — Yuri Astvatsaturov (57) ABSTRACT

Methods for determining a unit load device (ULD) door status are disclosed herein. An example method includes capturing a set of image data featuring the ULD. The example method further includes segmenting the set of image data to identify a top portion of the ULD, and determining an amplitude of the top portion of the ULD. The example method further includes determining the ULD door status based on whether the amplitude of the top portion of the ULD exceeds an amplitude threshold.

17 Claims, 7 Drawing Sheets

METHODS FOR UNIT LOAD DEVICE (ULD) DOOR TARP DETECTION

BACKGROUND

In commercial shipping via airplanes, packages are loaded into containers called unit load devices (ULDs). Many different types of ULDs exist, of which about 20 are commonly used. This poses challenges for high-fidelity container analytics, because any algorithm must be generic enough to work with any ULD, but specific enough to provide accurate metrics for each specific container. Notably, in order to provide accurate metrics, such as a starting and ending fullness, the analytics system must determine a ULD door status (e.g., whether the door of the ULD is open or closed). This ULD door status determination is critical to properly calculate loading metrics. Correspondingly, a major point of emphasis in the transportation/shipping industry is performing high fidelity ULD door status determinations at the load point of such containers.

Unfortunately, determining the ULD door status for a ULD with a curved door is a substantial challenge for traditional systems that locate the ULD door when it is closed. Specifically, traditional systems struggle to determine the door status for a ULD with a tarp door because the tarp surface may undulate or otherwise curve due to packages or a lack thereof within the ULD. As a result, tarp doors may not make consistent contact with the bottom portion of the ULD, which may confuse or frustrate traditional systems that locate the closed ULD door to mark the beginning and end of loading sessions. Accordingly, various problems generally arise regarding how to properly determine ULD door statuses automatically, efficiently, and accurately at the loading point of the ULD.

Thus, there is a need for imaging systems and methods for ULD door status determination that allow for fast, efficient, and accurate real-time ULD door status assessments for ULD load point analytics.

SUMMARY

In an embodiment, the present invention is a method for determining a unit load device (ULD) door status. The method includes capturing a set of image data featuring the ULD. The method further includes segmenting the set of image data to identify a top portion of the ULD, and determining an amplitude of the top portion of the ULD. The method further includes determining the ULD door status based on whether the amplitude of the top portion of the ULD exceeds an amplitude threshold.

In a variation of this embodiment, the set of image data featuring the ULD comprises (i) a three-dimensional depth image and (ii) an amplitude image that is depth-aligned with the three-dimensional depth image. In another variation of this embodiment, the set of image data featuring the ULD comprises (i) a three-dimensional depth image and (ii) a red-green-blue (RGB) image, and the method further comprises aligning the RGB image with the three-dimensional depth image.

In another variation of this embodiment, the set of image data includes a plurality of pixels, and the method further comprises identifying the top portion of the ULD based on a predetermined height value and a predetermined height threshold. In this variation, the method further includes comparing a depth value of each pixel in the plurality of pixels to a predetermined depth value corresponding to the top portion of the ULD.

In yet another variation of this embodiment, the ULD door status is open when the amplitude of the top portion of the ULD exceeds the amplitude threshold, and the ULD door status is closed when the amplitude of the top portion of the ULD does not exceed the amplitude threshold.

In still another variation of this embodiment, the method further comprises training a machine learning model using (i) a plurality of sets of image data featuring a respective ULD, (ii) a plurality of segmented images, each segmented image featuring a top portion of a respective ULD, and (iii) one or more amplitude values from each of the plurality of segmented images, wherein each amplitude value represents an amplitude of the top portion of the respective ULD. In this variation, the method further comprises applying the machine learning model to the set of image data featuring the ULD to determine the ULD door status.

In still another variation of this embodiment, the set of image data is a first set of image data, and the method further comprises (a) capturing a second set of image data featuring the ULD a duration D after capturing the first set of image data, (b) designating the second set of image data as a current set of image data, (c) segmenting the current set of image data to identify a current top portion of the ULD, (d) determining a current amplitude of the current top portion of the ULD, (e) determining a current ULD door status based on whether the current amplitude of the current top portion of the ULD exceeds the amplitude threshold, (f) designating the current set of image data as a prior set of image data, (g) capturing a subsequent set of image data featuring the ULD the duration D after capturing the prior set of image data, (h) designating the subsequent set of image data as the current set of image data, and (i) iteratively performing steps (c)-(i) until the current amplitude does not exceed the amplitude threshold.

In another embodiment, the present invention is a system for determining a unit load device (ULD) door status. The system includes a housing, an imaging assembly at least partially within the housing and configured to capture a set of image data featuring the ULD, one or more processors, and a non-transitory computer-readable memory coupled to the imaging assembly and the one or more processors. The memory stores instructions thereon that, when executed by the one or more processors cause the one or more processors to segment the set of image data to identify a top portion of the ULD. The instructions further cause the one or more processors to determine an amplitude of the top portion of the ULD, and determine the ULD door status based on whether the amplitude of the top portion of the ULD exceeds an amplitude threshold.

In a variation of this embodiment, the set of image data featuring the ULD comprises (i) a three-dimensional depth image and (ii) an amplitude image that is depth-aligned with the three-dimensional depth image. In another variation of this embodiment, the set of image data featuring the ULD comprises (i) a three-dimensional depth image and (ii) a red-green-blue (RGB) image, and the instructions further cause the one or more processors to align the RGB image with the three-dimensional depth image.

In another variation of this embodiment, the set of image data includes a plurality of pixels, and the instructions further cause the one or more processors to identify the top portion of the ULD based on a predetermined height value and a predetermined height threshold. In this variation, the instructions further cause the one or more processors to compare a depth value of each pixel in the plurality of pixels to a predetermined depth value corresponding to the top portion of the ULD.

In yet another variation of this embodiment, the ULD door status is open when the amplitude of the top portion of the ULD exceeds the amplitude threshold, and the ULD door status is closed when the amplitude of the top portion of the ULD does not exceed the amplitude threshold.

In still another variation of this embodiment, the instructions further cause the one or more processors to train a machine learning model using (i) a plurality of sets of image data featuring a respective ULD, (ii) a plurality of segmented images, each segmented image featuring a top portion of a respective ULD, and (iii) one or more amplitude values from each of the plurality of segmented images, wherein each amplitude value represents an amplitude of the top portion of the respective ULD. In this variation, the instructions further cause the one or more processors to apply the machine learning model to the set of image data featuring the ULD to determine the ULD door status.

In still another variation of this embodiment, the set of image data is a first set of image data, and the instructions further cause the one or more processors to (a) capture a second set of image data featuring the ULD a duration D after capturing the first set of image data, (b) designate the second set of image data as a current set of image data, (c) segment the current set of image data to identify a current top portion of the ULD, (d) determine a current amplitude of the current top portion of the ULD, (e) determine a current ULD door status based on whether the current amplitude of the current top portion of the ULD exceeds the amplitude threshold, (f) designate the current set of image data as a prior set of image data, (g) capture a subsequent set of image data featuring the ULD the duration D after capturing the prior set of image data, (h) designate the subsequent set of image data as the current set of image data, and (i) iteratively perform steps (c)-(i) until the current amplitude does not exceed the amplitude threshold.

In yet another embodiment, the present invention is a tangible machine-readable medium comprising instructions for determining a unit load device (ULD) door status. When executed, the instructions cause a machine to at least capture a set of image data featuring the ULD, segment the set of image data to identify a top portion of the ULD, determine an amplitude of the top portion of the ULD, and determine the ULD door status based on whether the amplitude of the top portion of the ULD exceeds an amplitude threshold.

In a variation of this embodiment, the set of image data featuring the ULD comprises (i) a three-dimensional depth image and (ii) an amplitude image that is depth-aligned with the three-dimensional depth image. In another variation of this embodiment, the set of image data featuring the ULD comprises (i) a three-dimensional depth image and (ii) a red-green-blue (RGB) image, and the instructions further cause the machine to align the RGB image with the three-dimensional depth image.

In another variation of this embodiment, the set of image data includes a plurality of pixels, and the instructions further cause the machine to identify the top portion of the ULD based on a predetermined height value and a predetermined height threshold. In this variation, the instructions further cause the machine to compare a depth value of each pixel in the plurality of pixels to a predetermined depth value corresponding to the top portion of the ULD.

In yet another variation of this embodiment, the ULD door status is open when the amplitude of the top portion of the ULD exceeds the amplitude threshold, and the ULD door status is closed when the amplitude of the top portion of the ULD does not exceed the amplitude threshold.

In still another variation of this embodiment, the set of image data is a first set of image data, and the instructions further cause the machine to (a) capture a second set of image data featuring the ULD a duration D after capturing the first set of image data, (b) designate the second set of image data as a current set of image data, (c) segment the current set of image data to identify a current top portion of the ULD, (d) determine a current amplitude of the current top portion of the ULD, (e) determine a current ULD door status based on whether the current amplitude of the current top portion of the ULD exceeds the amplitude threshold, (f) designate the current set of image data as a prior set of image data, (g) capture a subsequent set of image data featuring the ULD the duration D after capturing the prior set of image data, (h) designate the subsequent set of image data as the current set of image data, and (i) iteratively perform steps (c)-(i) until the current amplitude does not exceed the amplitude threshold.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, shipping companies seek to accurately and efficiently detail the load status of each container for which they are responsible. Many companies incorporate imaging systems to provide this analysis (e.g., load monitoring units (LMUs)). However, these traditional imaging systems suffer from a number of drawbacks, such as being unable to effectively determine ULD door statuses within the system's field of view (FOV).

Consequently, the methods/systems of the present disclosure provide solutions to the ULD door status determination problems associated with the traditional imaging systems. Namely, a method of the present disclosure includes capturing a set of image data featuring a ULD. The method then includes segmenting the set of image data to identify a top portion of the ULD. The method further includes determining an amplitude of the top portion of the ULD, and determining the ULD door status based on whether the amplitude of the top portion of the ULD exceeds an amplitude threshold.

As used herein, the term "container" shall refer to any container transportable by at least one of a vehicle, a train, a marine vessel, and airplane, and configured to store transportable goods such as boxed and/or unboxed items and/or other types of freight. Accordingly, an example of a container includes an enclosed container fixedly attached to a platform with wheels and a hitch for towing by a powered vehicle. An example of a container also includes an enclosed container removably attached to a platform with wheels and a hitch for towing by a powered vehicle. An example of a container also includes an enclosure that is fixedly attached to a frame of a powered vehicle, such as the case may be with a delivery truck, box truck, etc. As such, while the exemplary embodiment(s) described below may appear to reference one kind of a container, the scope of the invention shall extend to other kinds of container, as defined above.

Figure 1A:
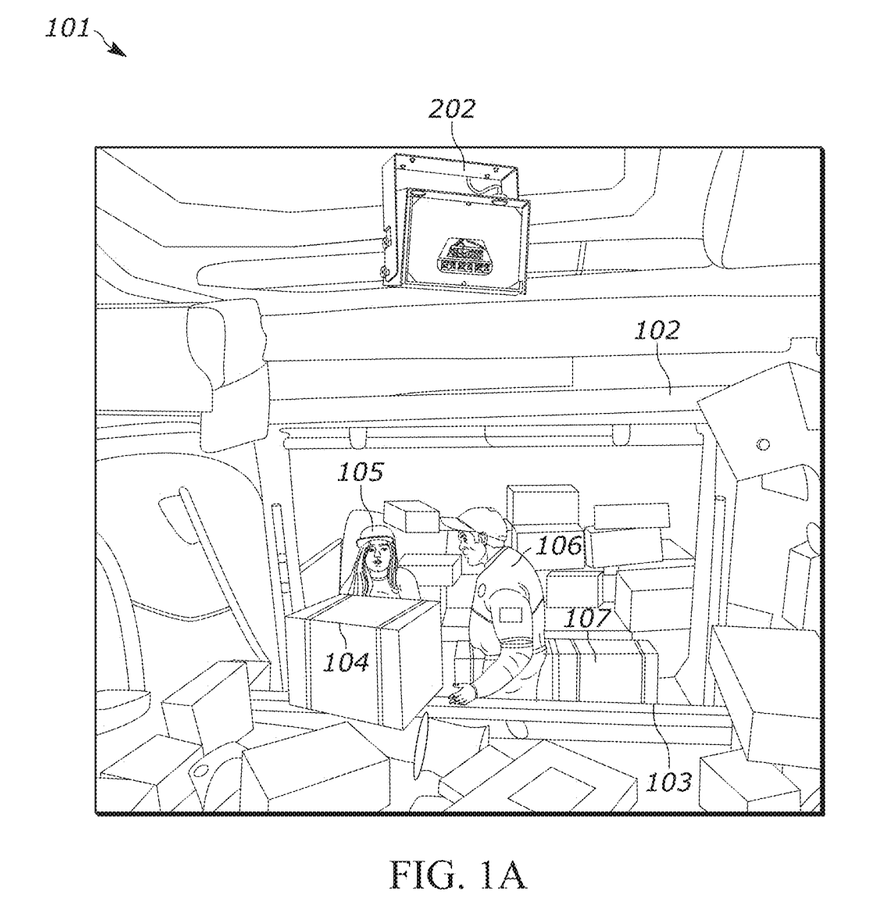
FIG. 1A is a perspective view, as seen from above, of a load point featuring a load monitoring unit (LMU) within a loading facility, in accordance with embodiments described herein.

FIG. 1A is a perspective view, as seen from above, of a load point 101 within a loading facility that depicts a LMU 202 having a 3D camera (e.g., a 3D-depth camera) oriented in a direction to capture 3D image data of a shipping container, in accordance with example embodiments herein. As depicted, shipping container 102 has a shipping container type of "AMJ." Generally, a shipping container is selected from one of several differently dimensioned containers. In various embodiments, shipping containers may comprise any type of ULD. For example, a shipping container type may be of any ULD type, including, for example, any of an AMJ type, an AAD type, an AKE type, an AYY type, a SAA type, and APE type, an AAX type, or an AQF type. For ULD shipping containers, the first letter (e.g., "A" for "Certified aircraft container") indicates a specific type of ULD container, such as certified, thermal, etc., the second letter represents base size in terms of dimensions (e.g., "M" for 96×125 inch), and the third letter represents a side contour size and shape (e.g., "J" for a cube shaped ULD container having a diagonal sloping roof portion on one side only). More generally, however, a shipping container may be any aircraft-based shipping container.

The load point 101 may be a predefined search space determined based on the shipping container size, dimensions, or otherwise configuration and/or the area in which the shipping area is localized. For example, in one embodiment, the predefined search space may be determined based on ULD type, shape, or position within a general area. As shown in FIG. 1A, for example, the predefined search space is determined based on the size and dimensions of the shipping container 102 which is of type AMJ. In general, load point 101 is defined so as to completely (or at least partially) include or image the shipping container. The load point 101 may further include a frontal area 103 that generally defines a front position of the predefined search space and/or shipping container 102.

FIG. 1A additionally depicts, within load point 101, personnel or loaders 105 and 106 that load packages 104 and 107 into the shipping container 102. In the embodiment of FIG. 1A, shipping container 102 is being loaded by loaders 105 with packages 104 and 107 during a loading session. The loading session includes loading a set or group of identified packages into shipping container 102. The loaders 105 and 106 and packages 104 and 107, by movement through the load point 101, may generally cause occlusion and interference with the LMU 202 (as discussed for FIG. 2) capturing 3D image data, over time, of shipping container 102. Thus, accurately determining the container 102 door status within the load point 101 is critical to ensure that an improper container 102 door status determination does not further complicate the imaging difficulties posed by occlusion and interference during normal operations of a loading session.

Figure 1B:
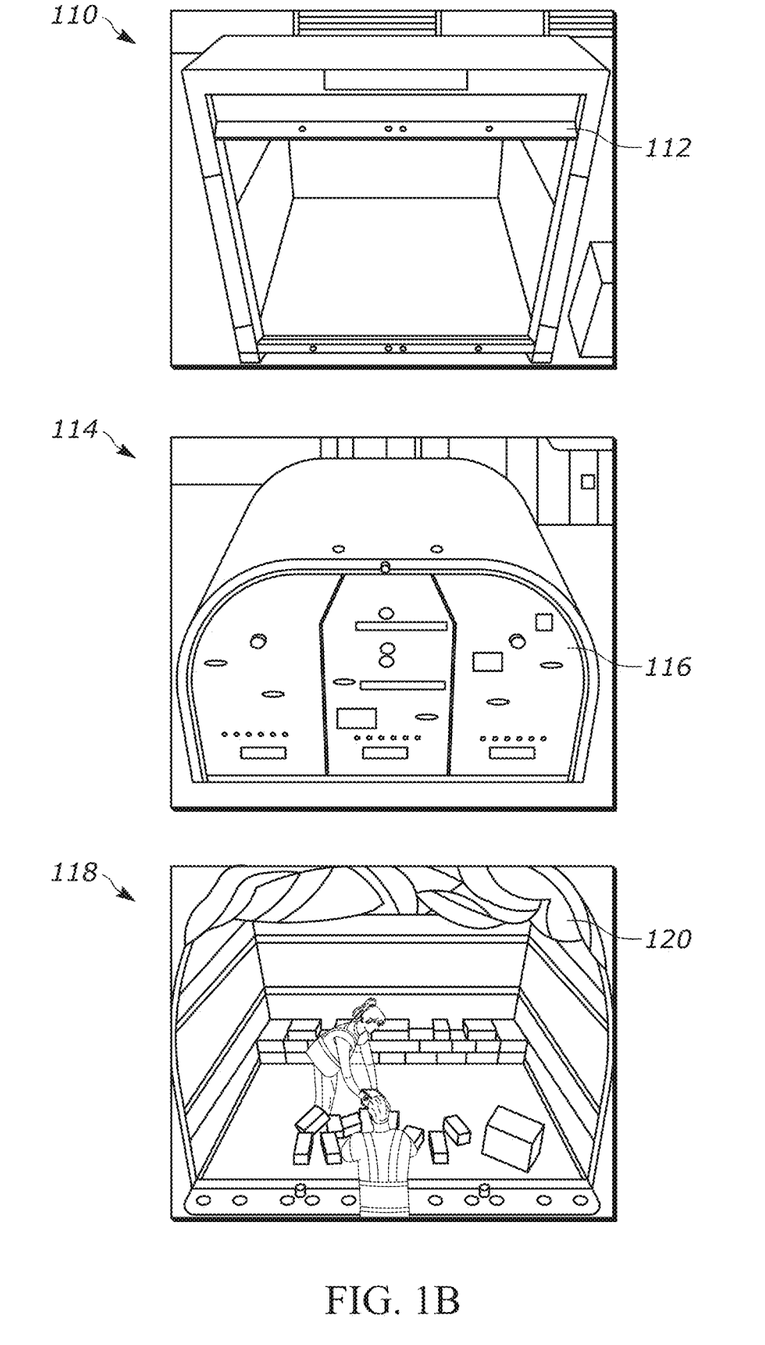
FIG. 1B is a set of example images, as seen from a point of view (POV) of the LMU, of unit load devices (ULDs) within the loading facility of FIG. 1A, in accordance with embodiments described herein.

FIG. 1B is a set of example images, as seen from a point of view (POV) of the LMU, of ULDs within the loading facility of FIG. 1A, in accordance with embodiments described herein. Generally speaking, and as illustrated in FIG. 1A, the LMU may be located at an elevated position within a loading point (e.g., load point 101) and oriented in a downward facing direction (e.g., toward the loading point floor). As a result, the LMU image sensor FOV may feature portions of, and the image sensors may capture images of, the top and front sides of a ULD. However, it is to be appreciated that the LMU may be positioned/oriented in any suitable manner to capture images of a front side, a top side, a back side, a bottom side, and/or any other side/surface of a ULD. In any event, these top and front side images allow the LMU to perform loading analytics (e.g., fullness analysis, etc.) with regard to the imaged ULD by determining a door status and examining the interior contents of the imaged ULD.

For example, the LMU may capture a first image 110 of an AAD type ULD featuring a roll-up style door 112. In the first image 110, the ULD may have the bottom of the roll-up style door 112 positioned at the top of the ULD front side, and as a result, the LMU should determine that the ULD is open. The LMU may also capture a second image 114 of an SAA type ULD featuring a metal panel door 116. In the second image 114, the ULD may have the metal panel door 116 positioned across the ULD front side, and as a result, the LMU should determine that the ULD is closed. The LMU may also capture a third image 118 of an AAX type ULD featuring a tarp door 120. In the third image 118, the ULD may have the tarp door 120 bunched at/near the top side of the ULD, and as a result, the LMU should determine that the ULD is open.

Figure 2:
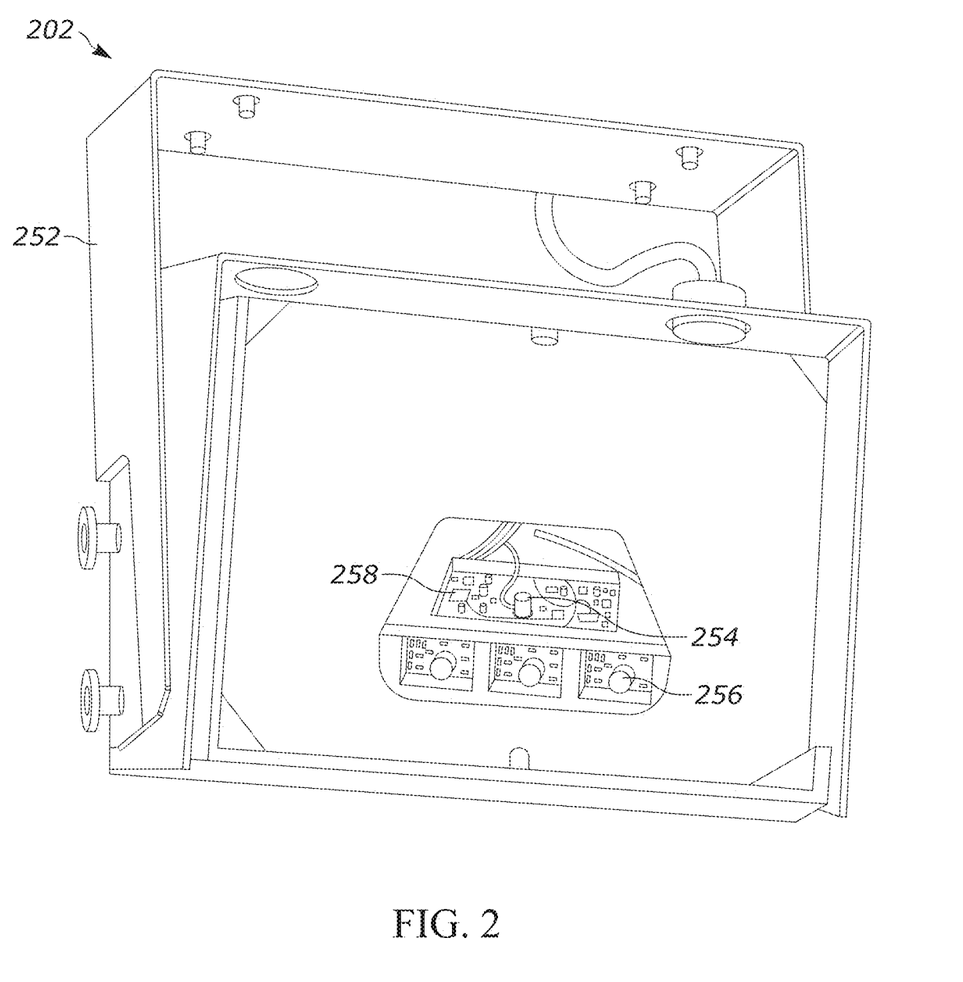
FIG. 2 is a perspective view of the LMU of FIGS. 1A and 1B, in accordance with embodiments described herein.

FIG. 2 is a perspective view of the LMU 202 of FIG. 1A, in accordance with example embodiments herein. In various embodiments, LMU 202 is a mountable device. Generally, an LMU 202 comprises camera(s) and a processing board and is configured to capture data of a loading scene (e.g., a scene including space 101). LMU 202 may run container fullness estimation and other advanced analytical algorithms.

LMU 202 may include a mounting bracket 252 for orienting or otherwise positioning the LMU 202 within a loading facility associated with the load point 101, as described herein. The LMU 202 may further include one or more processors and one or more memories for processing image data as described herein. For example, the LMU 202 may include flash memory used for determining, storing, or otherwise processing the imaging data/datasets and/or post-scanning data. In addition, LMU 202 may further include a network interface to enable communication with other devices.

LMU 202 may include a 3D camera 254 (also referenced herein as a "Time-of-Flight (To F) camera") for capturing, sensing, or scanning 3D image data/datasets. For example, in some embodiments, the 3D camera 254 may include an Infra-Red (IR) projector and a related IR camera. In such embodiments, the IR projector projects a pattern of IR light or beams onto an object or surface, which, in various embodiments herein, may include surfaces or areas of a predefined search space (e.g., load point 101) or objects within the predefined search area, such as boxes or packages (e.g., packages 104 and 107) and storage container 102. The IR light or beams may be distributed on the object or surface in a pattern of dots or points by the IR projector, which may be sensed or scanned by the IR camera. A depth-detection app, such as a depth-detection app executing on the one or more processors or memories of LMU 202, can determine, based on the pattern of dots or points, various depth values, for example, depth values of the predefined search area. For example, a near-depth object (e.g., nearby boxes, packages, etc.) may be determined where the dots or points are dense, and distant-depth objects (e.g., far boxes, packages, etc.) may be determined where the points are more spread out. The various depth values may be used by the depth-detection app and/or LMU 202 to generate a depth map. The depth map may represent a 3D image of, or contain 3D image data of, the objects or surfaces that were sensed or scanned by the 3D camera 254, for example, the load point 101 and any objects, areas, or surfaces therein. The 3D camera 254 may also be configured to capture other sets of image data in addition to the 3D image data, such as grayscale image data or amplitude image data, each of which may be depth-aligned with the 3D image data. The amplitude image data, for example, may represent the strength of return signal received by the IR camera, and more specifically, may indicate a strength of signal return for each pixel included in the IR camera image.

LMU 202 may further include a photo-realistic camera 256 for capturing, sensing, or scanning 2D image data. The photo-realistic camera 256 may be an RGB (red, green, blue) based camera for capturing 2D images having RGB-based pixel data. In some embodiments, the photo-realistic camera 256 may capture 2D images, and related 2D image data, at the same or similar point in time as the 3D camera 254 such that the LMU 202 can have both sets of 3D image data and 2D image data available for a particular surface, object, area, or scene at the same or similar instance in time. In embodiments, the 3D camera 254 and the photo-realistic camera 256 may be a single imaging apparatus configured to capture 3D depth image data simultaneously with 2D image data. Consequently, the captured 2D images and the corresponding 2D image data may be depth-aligned with the 3D images and 3D image data.

LMU 202 may also include a processing board 258 configured to, for example, perform container fullness estimation and other advanced analytical algorithms based on images captured by the cameras 254, 256. Generally, the processing board 258 may include one or more processors and one or more computer memories for storing image data, and/or for executing apps that perform analytics or other functions as described herein. The processing board 258 may also include transceivers and/or other components configured to communicate with external devices/servers. The processing board 258 may thus transmit and/or receive data or other signals to/from external devices/servers before, during, and/or after performing the analytical algorithms described herein.

In various embodiments, and as shown in FIG. 1A, the LMU 202 may be mounted within a loading facility and oriented in the direction of space 101 to capture 3D and/or 2D image data of shipping container 102. For example, as shown in FIGS. 1A and 1B, the LMU 202 may be oriented such that the 3D and 2D cameras of LMU 202 may capture 3D image data of shipping container 102, e.g., where LMU 202 may scan or sense the walls, floor, ceiling, packages, or other objects or surfaces within the space 101 to determine the 3D and 2D image data. The image data may be processed by the processing board 258 of the LMU 202 (or, in some embodiments, one or more remote processors and/or memories of a server) to implement analysis, functions, such as graphical or imaging analytics, as described by the one or more various flowcharts, block diagrams, methods, functions, or various embodiments herein. It should be noted that LMU 202 may capture 3D and/or 2D image data/datasets of a variety of loading facilities or other areas, such that additional loading facilities or areas (e.g., warehouses, etc.) in addition to the predefined search spaces (e.g., load point 101) are contemplated herein.

In some embodiments, for example, LMU 202 may process the 3D and 2D image data/datasets, as scanned or sensed from the 3D camera and photo-realistic camera, for use by other devices (e.g., an external server). For example, the processing board 258 of LMU 202 may process the image data or datasets captured, scanned, or sensed from load point 101. The processing of the image data may generate post-scanning data that may include metadata, simplified data, normalized data, result data, status data, or alert data as determined from the original scanned or sensed image data. In some embodiments, the image data and/or the post-scanning data may be sent to a client device/client application, such as a container feature assessment app that may be, for example, installed and executing on a client device, for viewing, manipulation, or otherwise interaction. In other embodiments, the image data and/or the post-scanning data may be sent to a server for storage or for further manipulation. For example, the image data and/or the post-scanning data may be sent to a server. In such embodiments, the server or servers may generate post-scanning data that may include metadata, simplified data, normalized data, result data, status data, or alert data as determined from the original scanned or sensed image data provided by LMU 202. As described herein, the server or other centralized processing unit and/or storage may store such data, and may also send the image data and/or the post-scanning data to a dashboard app, or other app, implemented on a client device, such as the container feature assessment app implemented on a client device.

Figure 3:
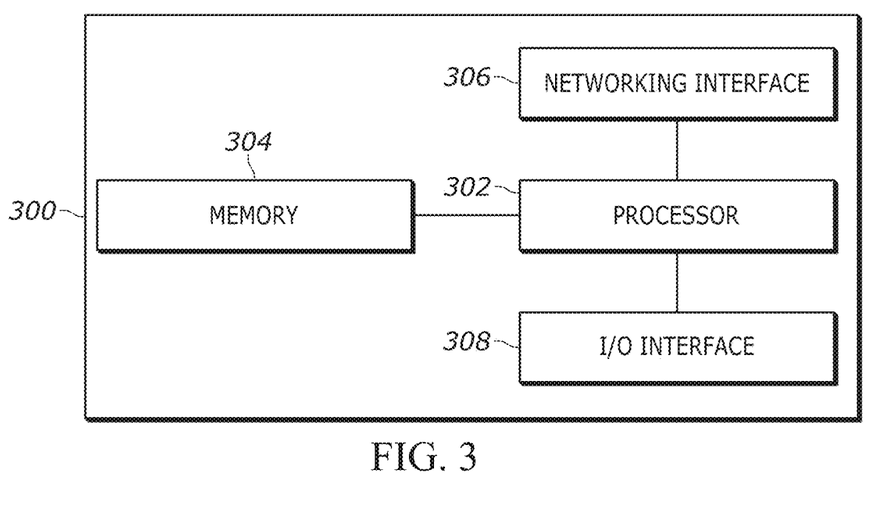
FIG. 3 is a block diagram of an example logic circuit for implementing example methods and/or operations described herein.

FIG. 3 is a block diagram representative of an example logic circuit capable of implementing, for example, one or more components of the example TMU of FIG. 2 or, more specifically, the example processing board 258 of FIG. 2. The example logic circuit of FIG. 3 is a processing platform 300 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 300 of FIG. 3 includes a processor 302 such as, for example, one or more microprocessors, controllers, and/or any suitable type of processor. The example processing platform 300 of FIG. 3 includes memory (e.g., volatile memory, non-volatile memory) 304 accessible by the processor 302 (e.g., via a memory controller). The example processor 302 interacts with the memory 304 to obtain, for example, machine-readable instructions stored in the memory 304 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 300 to provide access to the machine-readable instructions stored thereon.

The example processing platform 300 of FIG. 3 also includes a network interface 306 to enable communication with other machines via, for example, one or more networks. The example network interface 306 includes any suitable type of communication interface(s) (e.g., wired and/or wireless interfaces) configured to operate in accordance with any suitable protocol(s) (e.g., Ethernet for wired communications and/or IEEE 802.11 for wireless communications).

The example, processing platform 300 of FIG. 3 also includes input/output (I/O) interfaces 308 to enable receipt of user input and communication of output data to the user. Such user input and communication may include, for example, any number of keyboards, mice, USB drives, optical drives, screens, touchscreens, etc.

Figure 4:
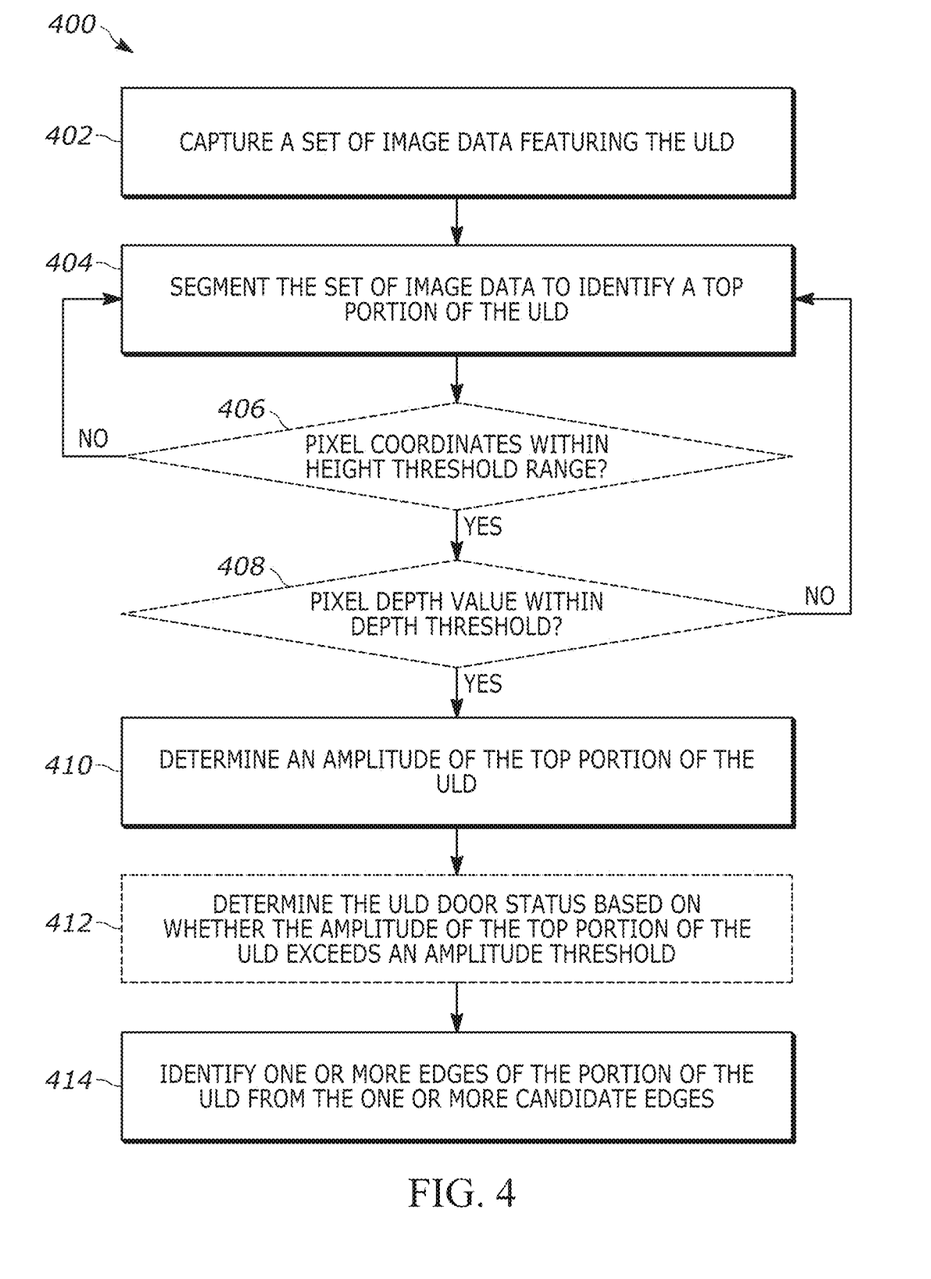
FIG. 4 is a flowchart representative of a method for determining a ULD door status, in accordance with embodiments described herein.

FIG. 4 is a flowchart representative of a method 400 for determining a ULD door status, in accordance with embodiments described herein. Method 400 describes various methods for determining a ULD door status, and embodiments of the method 400 are discussed below in context with FIGS. 5 and 6. Generally speaking, the method 400 for determining a ULD door status captures an image of the ULD within a load point (e.g., load point 101) and utilizes a known height of the ULD to determine a top portion of the ULD within the image. The known height of the ULD within the image may also include a depth value as well as Cartesian coordinates representing the expected location of the ULD within the image. It is to be appreciated that any suitable coordinate system or other measurement metric may be used to represent the expected location of the ULD within the image.

The method 400 begins by capturing a set of image data featuring the ULD (block 402). Broadly, the set of image data may represent the load point, such that the set of image data may feature the ULD when the ULD is located within the load point (e.g., during a loading session). The LMU 202 of FIG. 2 may automatically capture or receive a signal from an operator instructing the LMU 202 to capture a set of image data in response to the presence of a ULD in the load point (e.g., load point 101). For example, the set of image data may appear similar to the any of the first image 110, the second image 114, the third image 118, and/or other suitable images of ULDs. The LMU 202 may capture image data of the ULD using any number of cameras included in the LMU 202, such as the ToF camera 254 and/or the photo-realistic camera 256. In embodiments, the set of image data featuring the ULD may include (i) a three-dimensional depth image and (ii) an amplitude image that is depth-aligned with the three-dimensional depth image. Block 402 may be performed by, for example, the ToF camera 254 of FIG. 2.

In embodiments, the set of image data featuring the ULD comprises (i) a three-dimensional depth image and (ii) a red-green-blue (RGB) image. As mentioned, the imaging systems of the LMU may include multiple cameras, such as the ToF camera 254 and the photo-realistic camera 256. These cameras 254, 256 may be configured to capture image data simultaneously, but the two sets of image data may be from two different perspectives due to the physical displacement between the cameras 254, 256. Accordingly, in these embodiments, the LMU may align the image data captured by the photo-realistic camera 256 (RGB image) with the image data captured by the ToF camera 254.

The method 400 continues by segmenting the set of image data to identify a top portion of the ULD (block 404). Generally, when a tarp door is placed in the "open" position (as illustrated in the third image 118), the tarp material will bunch at the top of the ULD. This bunching effect may create an identifiable amplitude shift the LMU may use to more accurately determine the door status of ULDs with tarp doors. However, the amplitude shift may be more noticeable if the LMU accounts for the shape of the bunched tarp. Namely, the LMU may define a region extending above and below the top portion of the ULD to accommodate elevated and lowered portions of the tarp door as a result of the bunching effect. Block 404 may be performed by, for example, the processor 302.

Accordingly, the LMU may analyze the set of image data to identify a portion of the image data that roughly corresponds to the top of the ULD. Each data point (also referenced herein as "pixels") in the set of image data (e.g., a 3D point cloud) may have associated coordinates (also referenced herein as "pixel coordinates") within the image (e.g., Cartesian coordinate value or other suitable coordinate system value) and a depth value (also referenced herein as a "pixel depth value") relative to the LMU. The depth value for each data point included in the set of image data may describe, for example, a distance of an object represented by the pixel from the LMU. The LMU may calculate a physical position within the area represented in the image (e.g., load point 101) corresponding to the data point based on the data point coordinates and depth value. The LMU may utilize a predetermined height and/or width of a ULD that is stored in memory (e.g., memory 304), retrieved via the networking interface 306, and/or otherwise accessed to correlate the data points in the set of image data to the top portion of the ULD. Accordingly, the LMU may identify a row(s) and/or column(s) of data from the set of image data to represent the top portion of the ULD.

In embodiments, the predetermined height of the ULD may indicate a physical height of the ULD in three-dimensional space (e.g., 8 feet tall, 10 feet tall, etc.) and/or the predetermined height may indicate an expected position of the top edge of the ULD front side (or any other side) in the coordinate system values of the image data. Similarly, in embodiments, the depth value corresponding to a data point may be represented in feet, inches, meters, and/or any other suitable units, or combinations thereof. For example, the predetermined height may indicate that the expected location of the ULD top edge is (x, 200), where "x" refers to a horizontal displacement across the LMU FOV, and "200" refers to a vertical displacement from the bottom of the LMU FOV. It will be appreciated that the set of image data may be represented by any suitable coordinate system or metric.

Figure 5:
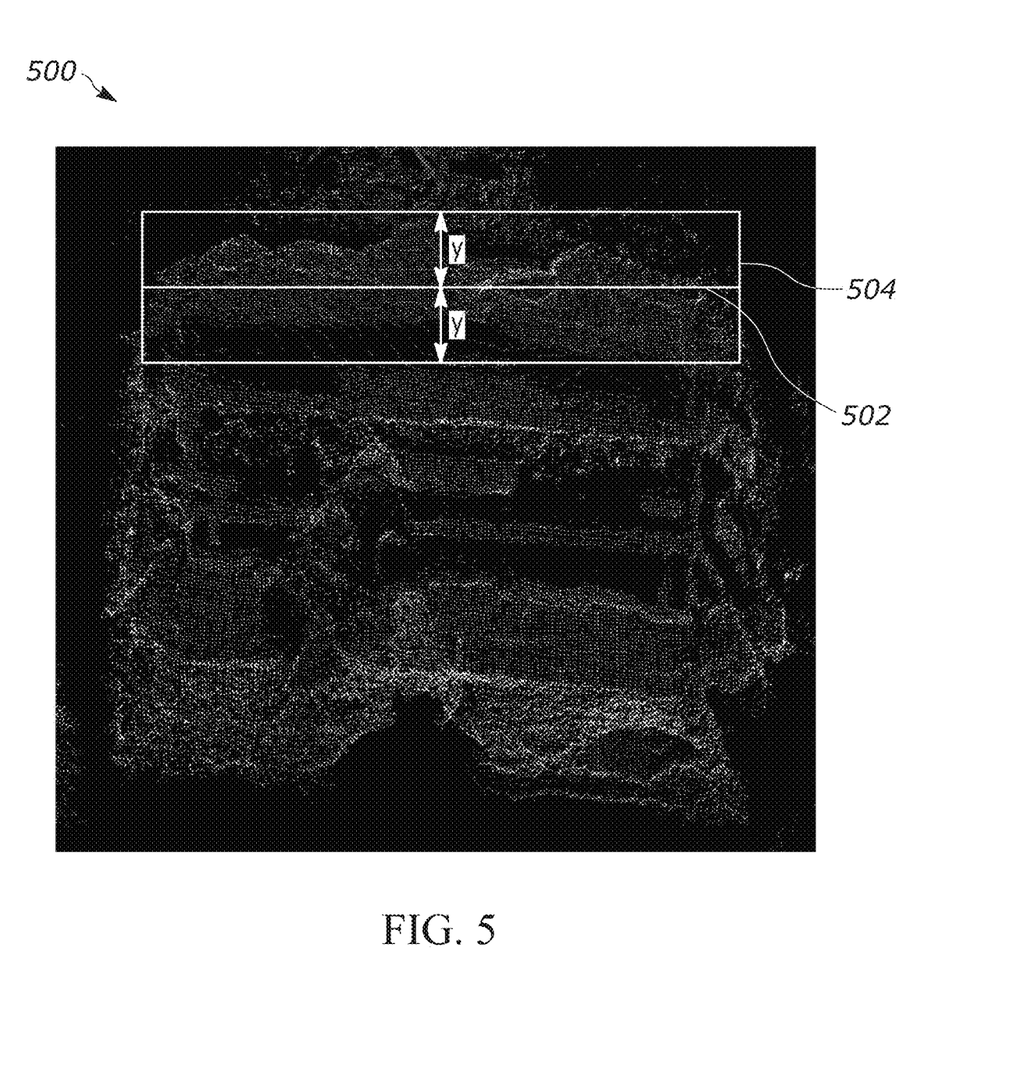
FIG. 5 illustrates a 3-D depth image of a ULD captured to facilitate example methods and/or operations described herein.

In reference to FIG. 5, the LMU may analyze a set of image data 500 by correlating the pixel coordinates and depth values to physical positions within the area represented in the image (e.g., load point 101), as described above. The LMU may then identify the top edge of the ULD front face 502 and apply a predetermined height threshold y to segment the set of image data 500. Applying the predetermined height threshold y may define a top portion of the ULD 504 that includes the image data comprising the top edge of the ULD front face 502 and any other image data contained within a height threshold y away from the top edge of the ULD front face 502. The predetermined height threshold y may represent different values for different ULD types. For example, smaller ULDs with tarp doors may have a correspondingly smaller height threshold y than larger ULDs with tarp doors because the smaller ULDs may have a smaller tarp, resulting in a reduced bunching effect at the top of the ULD.

The method 400 may continue by determining whether the pixel coordinates for all or a portion of the set of image data fall within a height threshold range (e.g., height threshold y) (optional block 406). Again in reference to FIG. 5, the LMU may determine for each data point in the set of image data 500 whether the pixel coordinates fall within the top portion of the ULD 504. If the LMU determines that the pixel coordinates for a particular data point fall within the height threshold range y (e.g., within the top portion of the ULD 504), then the LMU may continue to either optional block 408 or block 410 (YES branch of optional block 406). If the LMU determines that the pixel coordinates for a particular data point do not fall within the height threshold range y (e.g., within the top portion of the ULD 504), then the LMU may return to block 404 to select another data point within the set of image data 500 to analyze (NO branch of optional block 406). Optional block 406 may be performed by, for example, the processor 302.

The method 400 may continue by determining whether the pixel depth value for a particular data point is within a depth threshold of the top portion of the ULD (e.g., top portion of the ULD 504) (optional block 408). Generally speaking, and in reference to FIG. 5, data points included in the top portion of the ULD 504 may correspond to a ULD door (e.g., a tarp door), a top side of the ULD, or a portion of the area represented in the image (e.g., load point 101) that is behind the ULD. Those data points corresponding to the top side of the ULD, and more particularly, a ULD door may be more relevant to the present embodiments than those data points corresponding to a portion of the area represented in the image that is behind the ULD because the amplitude of the latter points may not change as the tarp door is opened or closed. Moreover, the amplitude values for those latter data points may be relatively low compared to the top side of the ULD and ULD door data points because the ULD may be significantly closer to the LMU than any background portion of the load point, resulting in a higher return signal to the ToF camera. As a result, the corresponding amplitude calculation with respect to the top portion of the ULD 504 may be skewed if data points associated with a portion of the area represented in the image that is behind the ULD are included in the calculation. Block 408 may be performed by, for example, the processor 302.

The LMU may retrieve from memory (e.g., memory 304), receive via a networking interface (e.g., networking interface 306), and/or otherwise access a depth threshold corresponding to a maximum depth value for any data point within the top portion of the ULD 504. If a particular data point within the top portion of the ULD 504 has an associated depth value that does not exceed the depth threshold, the method 400 may continue to block 410 (YES branch of optional block 408). If a particular data point within the top portion of the ULD 504 has an associated depth value that exceeds the depth threshold, the method 400 may return to block 404 to select another data point within the set of image data 500 to analyze (NO branch of optional block 408).

For example, assume that the depth threshold is 10 meters. The LMU may evaluate the depth value for each data point included in the top portion of the ULD 504, such that any data point in the top portion of the ULD 504 including a depth value that is greater than 10 meters may be excluded from the top portion of the ULD 504 for the remaining actions of the method 400. Accordingly, any subsequent actions performed as part of the method 400 involving the top portion of the ULD 504 may not include the excluded data points. Any data points including a depth value that does not exceed 10 meters may remain in the top portion of the ULD 504 for the remaining actions of the method 400.

It is to be understood that the method 400 may perform optional blocks 406 and 408 in any suitable order, and may perform one, both, or neither of the optional blocks 406, 408 as part of the method 400. For example, in embodiments, the method 400 may perform optional block 406 and continue directly to block 410 without performing optional block 408. Similarly, in embodiments, the method 400 may proceed from block 404 directly to optional block 408 without performing optional block 406.

The method 400 continues by determining an amplitude of the top portion of the ULD (block 410). As mentioned, the ToF camera 254 or other suitable image sensor may include an amplitude sensor to capture amplitude image data as part of the set of image data featuring the ULD. To illustrate, and in reference to FIG. 6, the LMU may capture a first amplitude image 600 at a first time featuring an open tarp door 602, and a second amplitude image 604 at a second time featuring a closed tarp door 606. The amplitude image data may include an amplitude value for each data point in the set of image data. Block 410 may be performed by, for example, the processor 302.

Figure 6:
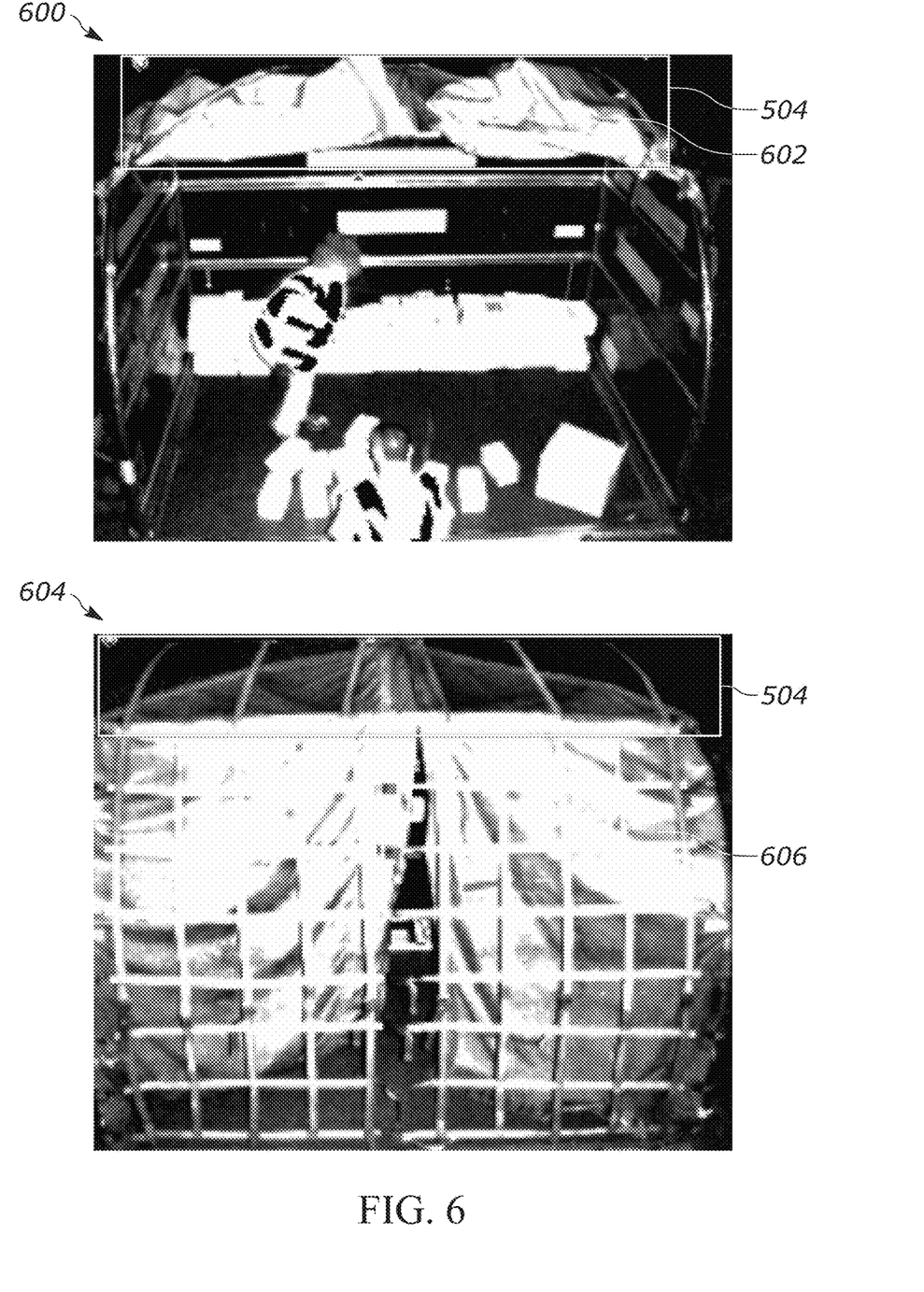
FIG. 6 illustrates two amplitude images of the ULD of FIG. 5 used to facilitate example methods and/or operations described herein.

For example, assume the amplitude values for each pixel represented in the amplitude images 600, 604 range from 0-1023, where 0 represents the darkest possible pixel (minimum amplitude) and 1023 represents the brightest possible pixel (maximum amplitude). The LMU may receive an amplitude threshold t of 500 (e.g., t=500), indicating that any pixel in the top portion of the ULD 504 in the amplitude images 600, 602 with an amplitude value above 500 may represent a tarp door, indicating that the ULD door is open. Similarly, any pixel in the top portion of the ULD 504 in the amplitude images 600, 602 with an amplitude value below 500 may represent a portion of the ULD top side, indicating that the ULD door is closed.

The tarp door bunching effect may influence the amplitude values for pixels included in the top portion of the ULD 504. As the tarp door is pushed to the top of the ULD, the bunching effect may angle portions of the tarp door away from the LMU, producing in a larger angle of incidence. As a result, signals transmitted from the LMU (e.g., ToF camera 254) to the angled portions of the tarp door may return to the LMU at a reduced amplitude and/or not return to the LMU entirely. If the amplitude of the pixels corresponding to those angled portions of the tarp door does not exceed the amplitude threshold t, those pixels may indicate a door status (e.g., "closed") that is contrary to the actual door status (e.g., "open"). Thus, the amplitude value of any particular pixel included in the top portion of the ULD 504 in either the first amplitude image 600, the second amplitude image 604, and/or any amplitude image captured of the ULD at any particular time may be insufficient to accurately determine the door status of the ULD.

For example, the first amplitude image 600 includes an open tarp door 602 within the top portion of the ULD 504. As illustrated, the open tarp door 602 bunches at the top of the ULD, and certain portions of the open tarp door 602, such as the middle and edges of the tarp door, are angled away from the LMU (e.g., the ToF camera 254), and thus appear darker. If the LMU analyzed the amplitude values of one or more pixels included the middle portion of the tarp door, the LMU may conclude that the ULD door status is "closed" because the amplitude values for those middle portion pixels may not exceed the amplitude threshold t.

Generally, and as previously mentioned, the bunching effect associated with the tarp door when positioned at the top of the ULD angles much of the tarp door toward the LMU (e.g., ToF camera 254), creating a relatively small angle of incidence for much if not most of the top portion of the ULD 504. By contrast, when the tarp door is closed, as in the second amplitude image 604, the much if not most of the top portion of the ULD 504 has a relatively large angle of incidence with respect to signals transmitted by the ToF camera 254. Thus, to minimize the impact of factors such as the bunching effect angling small portions of the tarp door away from the LMU, the LMU may take the average amplitude of all pixel amplitude values included in the top portion of the ULD 504.

For example, assume the top portion of the ULD 504 includes 1000 pixels. Further assume that pixels 1-800 have an amplitude value of 900 while pixels 801-1000 have an amplitude value of 50. The LMU may calculate the average amplitude of the top portion of the ULD 504 by summing the amplitude values for each pixel included in the top portion of the ULD 504 and dividing by the total number of pixels included in the top portion of the ULD 504. Accordingly, the LMU may perform a calculation of the form:

$$A_{avg} = \frac{\Sigma A_{pixels}}{N}, \quad (1)$$

where $A_{avg}$ is the average amplitude of the top portion of the ULD 504, $A_{pixels}$ is the amplitude of an individual pixel in the amplitude image, and N is the total number of pixels included in the amplitude image within the top portion of the ULD 504. In this example, the LMU may determine that $A_{avg}$ is equivalent to 730.

It is to be understood that the LMU may perform any suitable calculation to achieve a representative measurement of the amplitude of the top portion of the ULD 504. For example, and without limitation, the LMU may calculate an average, a mean, a median, a mode, a geometric mean, a harmonic mean, a weighted mean, a quadratic mean, a cubic mean, and/or any other suitable statistical interpretation or combination(s) thereof with respect to the amplitude values of the pixels included in the top portion of the ULD 504.

The method 400 continues by determining the ULD door status based on whether the amplitude of the top portion of the ULD 504 exceeds an amplitude threshold (e.g., amplitude threshold t). Broadly speaking, the LMU may determine the ULD door status to be either "closed" or "open" based on the average amplitude of the top portion of the ULD 504. If the LMU determines that the average amplitude of the top portion of the ULD 504 exceeds the amplitude threshold t, then the LMU may determine that the ULD door status is "open". If the LMU determines that the average amplitude of the top portion of the ULD 504 does not exceed the amplitude threshold t, then the LMU may determine that the ULD door status is "closed". Block 412 may be performed by, for example, the processor 302.

Continuing the above example, assume that the LMU additionally receives, generates, or otherwise accesses an amplitude threshold t of 500. The LMU may compare the average amplitude of the top portion of the ULD 504 to the amplitude threshold t and determine that the average amplitude of the top portion of the ULD 504 exceeds the amplitude threshold t (e.g., $A_{avg}$>t or 730>500). Accordingly, the LMU may determine that the ULD door status is "open".

In another example, assume the top portion of the ULD 504 includes 1000 pixels. Further assume that the LMU receives, generates, or otherwise accesses an amplitude threshold t of 500, and that pixels 1-800 have an amplitude value of 45 while pixels 801-1000 have an amplitude value of 600. The LMU may determine, using (1), that $A_{avg}$ is equivalent to 156. The LMU may then compare the average amplitude of the top portion of the ULD 504 to the amplitude threshold t and determine that the average amplitude of the top portion of the ULD 504 does not exceed the amplitude threshold t (e.g., $A_{avg}$<t or 156<500). Accordingly, the LMU may determine that the ULD door status is "closed".

In embodiments, the LMU may utilize RGB images when determining the ULD door status. Generally, a tarp door for a ULD may have a distinct color from the remainder of the ULD. For example, a tarp door may be red, and the remainder of the ULD may be a dark blue-grey, carbon-grey, or black color due to the typical metal materials comprising many ULDs. Thus, the LMU may determine a color value for the top portion of the ULD based on an RGB image featuring the ULD. The color value for the top portion of the ULD may be represented as a numerical value, a composite of numerical percentages indicating represented color values (e.g., 35% red, 50% green, 15% yellow), and/or any other suitable indication or combination(s) thereof. The LMU may also receive, generate, or otherwise access a color threshold corresponding to the top portion of the ULD. In these embodiments, if the color value of the top portion of the ULD does not exceed, is not substantially similar to, or otherwise fails to satisfy the color threshold, the LMU may determine the ULD door status is "closed". If the color value of the top portion of the ULD exceeds, is substantially similar to, or otherwise satisfies the color threshold, the LMU may determine the ULD door status is "open".

In embodiments, determining the ULD door status may include training a machine learning model to perform the determination automatically. For example, the processing platform 300 may include a machine learning model in memory 304. The machine learning model may include, for example, a convolutional neural network and/or any other suitable machine learning technique. The processing platform 300 may train the machine learning model using (i) a plurality of sets of image data featuring a respective ULD, (ii) a plurality of segmented images, each segmented image featuring a top portion of a respective ULD, and (iii) one or more amplitude values from each of the plurality of segmented images. Each amplitude value may represent an amplitude of the top portion of the respective ULD, as described herein.

Generally, the machine learning model training may take place in two steps. First, the machine learning model may analyze each of the plurality of sets of image data featuring a respective ULD in an attempt to determine the respective top portions of the featured ULDs. The machine learning model may determine a set of respective top portions of the featured ULDs that may be compared to the known respective top portions of the featured ULDs. Based on how closely the set of respective top portions of the featured ULDs matches the known respective top portions of the featured ULDs, the model may be adjusted to more accurately identify respective top portions of featured ULDs in future iterations.

Second, the machine learning model may analyze the plurality of segmented images in an attempt to determine amplitude values for the respective top portions of the featured ULDs. The machine learning model may determine a set of amplitude values that may be compared to the known amplitude values. Based on how closely the set of amplitude values matches the known amplitude values, the model may be adjusted to more accurately determine amplitude values in future iterations.

Similarly, in embodiments, determining the ULD door status may include applying the machine learning model to the set of image data featuring the ULD to determine the ULD door status. In this manner, the processing platform 300 may train and apply the machine learning model to automatically determine ULD door statuses based on captured sets of image data featuring ULDs, and may thus increase overall system efficiency by reducing the processing bandwidth necessary to perform the ULD door status determinations.

Generally speaking, while a ULD is located at a load point (e.g., load point 101), the ULD may be loaded, unloaded, and/or otherwise interacted with for a particular duration (e.g., a loading session). During that duration, the LMU may constantly perform analytics with respect to the ULD to follow the progress of loading, unloading, etc. The analytics performed by the LMU may be processor intensive and may provide critical information to commercial shipping companies and their customers. If the LMU errantly performs container analytics after loading session concludes, the resulting analytics may be skewed, resulting in erratic results and customer dissatisfaction.

Consequently, in embodiments, the LMU may iteratively perform the ULD door status determination. Generally, the LMU 202 may iteratively (i) capture subsequent sets of image data featuring a ULD, (ii) designate the subsequent sets of image data as current sets of image data, (iii) segment the subsequent sets of image data to identify a current top portion of the ULD, (iv) determine a current amplitude of the current top portion of the ULD, (v) determine a current ULD door status based on a comparison of the current amplitude of the top portion of the ULD to the amplitude threshold, and (vi) designate the subsequent sets of image data as prior sets of image data until the LMU determines that the loading session has ended. For example, the LMU may iteratively perform (i)-(vi) until the current ULD door status is "closed" (e.g., the result of (v) indicates that the ULD door is closed).

More specifically, the set of image data may be a first set of image data, and the LMU may capture a second set of image data featuring the ULD. The LMU 202 may capture the second set of image data a duration D after capturing the first set of image data. It should be understood that the duration D may be any suitable duration of time (e.g., seconds, minutes, hours, etc.)

The LMU may then designate the second set of image data as a current set of image data. The LMU may then segment the current set of image data to identify a current top portion of the ULD, as described herein. The current top portion of the ULD may be identical to the top portion of the ULD featured in the first set of image data, or the current top portion of the ULD may include a portion of the ULD that is different from the top portion of the ULD featured in the first set of image data. The LMU may then determine a current amplitude of the current top portion of the ULD, as described herein. The current amplitude may be determined in an identical manner to the amplitude in the first set of image data (e.g., an average amplitude), or the current amplitude may be determined in accordance with any of the calculation methods described herein.

The LMU 202 may then determine a current ULD door status based on whether the current amplitude of the current top portion of the ULD exceeds the amplitude threshold. The LMU may determine the current ULD door status is "open" if the current amplitude of the current top portion of the ULD exceeds the amplitude threshold, and the LMU may determine the current ULD door status is "closed" if the current amplitude of the current top portion of the ULD does not exceed the amplitude threshold. After determining the current ULD door status, the LMU may designate the current set of image data as a prior set of image data, and may capture a subsequent set of image data featuring the ULD the duration D after capturing the prior set of image data. The LMU may then designate the subsequent set of image data as the current set of image data.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for determining a unit load device (ULD) door status, comprising:
   capturing a set of image data featuring the ULD;
   segmenting the set of image data to identify a top portion of the ULD;
   determining an amplitude of the top portion of the ULD; and
   determining the ULD door status based on whether the amplitude of the top portion of the ULD exceeds an amplitude threshold,
   wherein the set of image data is a first set of image data, and the method further comprises:
   (a) capturing a second set of image data featuring the ULD a duration D after capturing the first set of image data;
   (b) designating the second set of image data as a current set of image data;
   (c) segmenting the current set of image data to identify a current top portion of the ULD;
   (d) determining a current amplitude of the current top portion of the ULD;
   (e) determining a current ULD door status based on whether the current amplitude of the current top portion of the ULD exceeds the amplitude threshold;
   (f) designating the current set of image data as a prior set of image data;

(g) capturing a subsequent set of image data featuring the ULD the duration D after capturing the prior set of image data;
(h) designating the subsequent set of image data as the current set of image data; and
(i) iteratively performing steps (c)-(i) until the current amplitude does not exceed the amplitude threshold.

2. The method of claim 1, wherein the set of image data featuring the ULD comprises (i) a three-dimensional depth image and (ii) an amplitude image that is depth-aligned with the three-dimensional depth image.

3. The method of claim 1, wherein the set of image data featuring the ULD comprises (i) a three-dimensional depth image and (ii) a red-green-blue (RGB) image, and wherein the method further comprises:
aligning the RGB image with the three-dimensional depth image.

4. The method of claim 1, wherein the set of image data includes a plurality of pixels, and the method further comprising:
identifying the top portion of the ULD based on a predetermined height value and a predetermined height threshold; and
comparing a depth value of each pixel in the plurality of pixels to a predetermined depth value corresponding to the top portion of the ULD.

5. The method of claim 1, wherein the ULD door status is open when the amplitude of the top portion of the ULD exceeds the amplitude threshold, and wherein the ULD door status is closed when the amplitude of the top portion of the ULD does not exceed the amplitude threshold.

6. The method of claim 1, further comprising:
training a machine learning model using (i) a plurality of sets of image data featuring a respective ULD, (ii) a plurality of segmented images, each segmented image featuring a top portion of a respective ULD, and (iii) one or more amplitude values from each of the plurality of segmented images, wherein each amplitude value represents an amplitude of the top portion of the respective ULD; and
applying the machine learning model to the set of image data featuring the ULD to determine the ULD door status.

7. A system for determining a unit load device (ULD) door status, comprising:
a housing;
an imaging assembly at least partially within the housing and configured to capture a set of image data featuring the ULD;
one or more processors; and
a non-transitory computer-readable memory coupled to the imaging assembly and the one or more processors, the memory storing instructions thereon that, when executed by the one or more processors, cause the one or more processors to:
segment the set of image data to identify a top portion of the ULD,
determine an amplitude of the top portion of the ULD, and
determine the ULD door status based on whether the amplitude of the top portion of the ULD exceeds an amplitude threshold,
wherein the set of image data is a first set of image data, and the instructions, when executed by the one or more processors, further cause the one or more processors to:
(a) capture a second set of image data featuring the ULD a duration D after capturing the first set of image data;
(b) designate the second set of image data as a current set of image data;
(c) segment the current set of image data to identify a current top portion of the ULD;
(d) determine a current amplitude of the current top portion of the ULD;
(e) determine a current ULD door status based on whether the current amplitude of the current top portion of the ULD exceeds the amplitude threshold;
(f) designate the current set of image data as a prior set of image data;
(g) capture a subsequent set of image data featuring the ULD the duration D after capturing the prior set of image data;
(h) designate the subsequent set of image data as the current set of image data; and
(i) iteratively perform steps (c)-(i) until the current amplitude does not exceed the amplitude threshold.

8. The system of claim 7, wherein the set of image data featuring the ULD comprises (i) a three-dimensional depth image and (ii) an amplitude image that is depth-aligned with the three-dimensional depth image.

9. The system of claim 7, wherein the set of image data featuring the ULD comprises (i) a three-dimensional depth image and (ii) a red-green-blue (RGB) image, and wherein the instructions, when executed by the one or more processors, further cause the one or more processors to:
align the RGB image with the three-dimensional depth image.

10. The system of claim 7, wherein the set of image data includes a plurality of pixels, and the instructions, when executed by the one or more processors, further cause the one or more processors to:
identify the top portion of the ULD based on a predetermined height value and a predetermined height threshold; and
compare a depth value of each pixel in the plurality of pixels to a predetermined depth value corresponding to the top portion of the ULD.

11. The system of claim 7, wherein the ULD door status is open when the amplitude of the top portion of the ULD exceeds the amplitude threshold, and wherein the ULD door status is closed when the amplitude of the top portion of the ULD does not exceed the amplitude threshold.

12. The system of claim 7, wherein the instructions, when executed by the one or more processors, further cause the one or more processors to:
train a machine learning model using (i) a plurality of sets of image data featuring a respective ULD, (ii) a plurality of segmented images, each segmented image featuring a top portion of a respective ULD, and (iii) one or more amplitude values from each of the plurality of segmented images, wherein each amplitude value represents an amplitude of the top portion of the respective ULD; and
apply the machine learning model to the set of image data featuring the ULD to determine the ULD door status.

13. A tangible machine-readable medium comprising instructions for determining a unit load device (ULD) door status that, when executed, cause a machine to at least:
capture a set of image data featuring the ULD;
segment the set of image data to identify a top portion of the ULD;
determine an amplitude of the top portion of the ULD; and
determine the ULD door status based on whether the amplitude of the top portion of the ULD exceeds an amplitude threshold, wherein the set of image data is a first set of image data, and the instructions, when executed, further cause the machine to:
(a) capture a second set of image data featuring the ULD a duration D after capturing the first set of image data;
(b) designate the second set of image data as a current set of image data;
(c) segment the current set of image data to identify a current top portion of the ULD;
(d) determine a current amplitude of the current top portion of the ULD;
(e) determine a current ULD door status based on whether the current amplitude of the current top portion of the ULD exceeds the amplitude threshold;
(f) designate the current set of image data as a prior set of image data;
(g) capture a subsequent set of image data featuring the ULD the duration D after capturing the prior set of image data;
(h) designate the subsequent set of image data as the current set of image data; and
(i) iteratively perform steps (c)-(i) until the current amplitude does not exceed the amplitude threshold.

14. The tangible machine-readable medium of claim 13, wherein the set of image data featuring the ULD comprises (i) a three-dimensional depth image and (ii) an amplitude image that is depth-aligned with the three-dimensional depth image.

15. The tangible machine-readable medium of claim 13, wherein the set of image data featuring the ULD comprises (i) a three-dimensional depth image and (ii) a red-green-blue (RGB) image, and wherein the instructions, when executed, further cause the machine to:
align the RGB image with the three-dimensional depth image.

16. The tangible machine-readable medium of claim 13, wherein the set of image data includes a plurality of pixels, and the instructions, when executed, further cause the machine to:
identify the top portion of the ULD based on a predetermined height value and a predetermined height threshold; and
compare a depth value of each pixel in the plurality of pixels to a predetermined depth value corresponding to the top portion of the ULD.

17. The tangible machine-readable medium of claim 13, wherein the ULD door status is open when the amplitude of the top portion of the ULD exceeds the amplitude threshold, and wherein the ULD door status is closed when the amplitude of the top portion of the ULD does not exceed the amplitude threshold.

* * * * *